(12) United States Patent
Mountain et al.

(10) Patent No.: US 9,397,543 B2
(45) Date of Patent: Jul. 19, 2016

(54) ELECTRICAL MACHINE (75) Inventors: Stephen J. Mountain, Derby (GB); Ellis F H Chong, Derby (GB)

(73) Assignee: ROLLS-ROYCE PLC, London (GB)

( * ) Notice: Subject to any disclaimer, the term of this patent is extended or adjusted under 35 U.S.C. 154(b) by 242 days.

(21) Appl. No.: 13/980,589

(22) PCT Filed: Jan. 26, 2012

(86) PCT No.: PCT/EP2012/051206
§ 371 (c)(1),
(2), (4) Date: Jul. 19, 2013

(87) PCT Pub. No.: WO2012/110286
PCT Pub. Date: Aug. 23, 2012

(65) Prior Publication Data
US 2013/0292941 A1 Nov. 7, 2013

(30) Foreign Application Priority Data
Feb. 16, 2011 (GB) .................................. 1102682.0

(51) Int. Cl.
H02K 16/04 (2006.01)
H02K 49/00 (2006.01)
H02P 9/14 (2006.01)
H02K 49/10 (2006.01)
H02K 7/18 (2006.01)
H02P 6/00 (2016.01)

(52) U.S. Cl.
CPC ............. *H02K 16/04* (2013.01); *H02K 7/1823* (2013.01); *H02K 49/102* (2013.01); *H02P 6/005* (2013.01); *H02P 9/14* (2013.01)

(58) Field of Classification Search
CPC ................... H02K 49/00–49/12; H02K 16/04

USPC .......................... 310/103, 104, 112, 114, 266
See application file for complete search history.

(56) References Cited

U.S. PATENT DOCUMENTS 6,794,781 B2 * 9/2004 Razzell .................... H02K 7/11
290/55
7,411,325 B1 * 8/2008 Gabrys ................ H02K 11/048
310/216.067

(Continued)

FOREIGN PATENT DOCUMENTS

| EP | 2 161 821 A1 | 3/2010 | |
|---|---|---|---|
| GB | 1376539 A | 12/1974 | |
| GB | 2 437 568 A | 10/2007 | |
| GB | 2468888 A | 9/2010 | |
| WO | WO 2010109210 A1 * | 9/2010 | ............. F16F 15/30 |

OTHER PUBLICATIONS

Jan. 23, 2013 Search Report issued in International Patent Application No. PCT/EP2012/051206.

(Continued)

*Primary Examiner* — Thomas Truong
(74) *Attorney, Agent, or Firm* — Oliff PLC (57) ABSTRACT

An electromagnetic machine, comprising: a first stator winding having a first number of pole pairs; a second stator winding having a second number of pole pairs which is different to the first number of pole pairs; and, a modulator having a plurality of pole pieces arranged relative to the first and second stator windings so as to modulate the electromagnetic fields produced by the first and second stator windings, thereby matching harmonic spectra of the first and second stator windings.

18 Claims, 4 Drawing Sheets

(56) References Cited

U.S. PATENT DOCUMENTS

| | | | | |
|---|---|---|---|---|
| 2007/0186692 | A1* | 8/2007 | Waszak | F03D 7/0272 73/862.331 |
| 2009/0309442 | A1* | 12/2009 | Qu et al. | 310/114 |
| 2010/0052323 | A1* | 3/2010 | Vyas et al. | 290/44 |
| 2012/0111689 | A1* | 5/2012 | Atkins | F16F 15/30 192/84.3 |

OTHER PUBLICATIONS

Atallah et al; "A Novel 'Pseudo' Direct-Drive Brushless Permanent Magnet Machine;" IEEE Transaction on Magnetics; Nov. 2008; vol. 44; No. 11; pp. 4349-4352.

Atallah et al; "A Novel High-Performance Magnetic Gear;" IEEE Transactions on Magnetics; Jul. 2001; vol. 37; No. 4; pp. 2844-2846.

\* cited by examiner

ELECTRICAL MACHINE

The present invention relates to an electrical machine. In particular, the invention relates to a variable speed electrical motor, or a voltage regulated electrical generator.

There are many different known architectures of electrical machine which can be used for variable speed drives or to generate electricity from variable speed mechanical drives. The present invention seeks to provide a new type of electrical machine architecture.

In a first aspect, the present invention provides an electromagnetic machine, comprising: a first stator winding having a first number of pole pairs; a second stator winding having a second number of pole pairs which is different to the first number of pole pairs; and, a modulator having a plurality of pole pieces arranged relative to the first and second stator windings so as to modulate the electromagnetic fields produced by the first and second stator windings, thereby matching harmonic spectra of the first and second stator windings.

Having first and second stator windings and a modulator allows a modulated magnetic field to be set up in the machine. The modulation acts to match and lock asynchronous harmonics between the spatially distributed electromagnetic fields of the first and second stator windings thereby providing a geared synchronous electromagnetic field between the windings. Providing one or both of the first and second stator windings with a rotating magnetic field thus results in the rotation of the modulator in a geared manner, or a generating function if the modulator is rotated.

The geared nature of the machine means that a fixed frequency power generation can be achieved from a variable speed input without the need for a fully rated power converter. Furthermore, because the first and second stator windings are stationary, there are no rotating electrical windings and no sliprings. Furthermore, there are neither permanent magnets nor an exciter assembly as may ordinarily be required for a conventional synchronous machine. The electrical machine can also be used as a variable speed motor in which one of the windings can provide geared speed control. This also prevents the need for a full rated power convertor for a given speed range.

The modulator can include high permeability regions and low permeability regions. The high permeability regions may have a permeability greater than 100. Preferably, high permeability regions are greater than 1000. The high permeability regions can be pole pieces. The pole pieces can be laminated. The pole pieces can be steel. The low permeability regions may be air. Preferably, the low permeability regions are used for structural support of the stator components using suitable low permeability and low remanence materials.

The modulator can be positioned between the first and second stator windings. Alternatively, either the first or second stator winding can be positioned between the other of the first or second stator winding and the modulator. The first and second stator windings can be proximate to one another. Preferably, the first and second stator windings are located on the same stator. The first and second stator windings may be located on a common ferromagnetic flux guide. The first and second stator windings can have substantially no air gap therebetween. Preferably, the first and second stator windings will be separated by a low permeability layer which provides structural support.

The first and second stator windings form part of first and second stators respectively. The first and second stators may include flux guides. The flux guides may be ferromagnetic. The ferromagnetic flux guides may include stator poles. Either or both of the first and second stators may include slots which receive the respective first and seconds stator windings. The slots may be uniform in cross section. Alternatively, the slots may taper towards the pole face of the stator pole pieces. In this way, the stator poles may be flared.

The stator flux guides and or the stator poles may be laminated. Preferably, the stator poles have a high magnetic permeability.

The stator flux guides may include back iron portions. The back iron portions may provide a high permeability envelope in which the first stator winding, the second stator winding and the modulator are located. The back iron portions may be an integral part of the either or both of the first and second stators, or part of either or one of the first and second stators, and the modulator.

Preferably, the modulator is rotatable and the first and second stator windings are stationary relative to the modulator and to each other. The first and second stator windings may be part of a first and second stator. The first and second stators may be fixed relative to one another. The first and second stators may be fixed relative to one another via a housing of the electrical machine. The housing may include the back iron portion.

The electromagnetic machine may be a radial flux machine. That is, the first and second stator windings can be arranged so as to provide radial flux with respect to the axis of rotation of the modulator. Alternatively, the electromagnetic machine may be an axial flux machine. That is, the first and second stator windings may be arranged so as to provide axial flux with respect to the axis of rotation of the modulator.

Preferably, the pole pairs of the first and second stator windings and the pole pieces of the modulator have a predetermined ratio which allows the modulation of the electromagnetic field. Preferably, the predetermined ratio adheres to the condition that the sum of the first and second stator pole pairs is the same as the number of pole pieces.

In a second aspect, the present invention provides an electrical system, comprising: the electromagnetic machine of the first aspect; a convertor connected to at least one of the first or second windings; and, an electrical network connected to the other of the first and second windings.

The electrical network may be a mains grid. The mains grid may include a stiff network having a high electrical inertia. The stiff network may have a substantially constant voltage. The stiff network may have a substantially constant frequency.

Alternatively, the electrical network may be an isolated grid having a low inertia. The isolated network may have a variable frequency. The isolated network may have a variable voltage. The isolated grid may include between one and ten electrical generators. The generators may be low power. For example, the generators may have rated power outputs of below 1 MW each. The isolated grid may include a plurality of wind or tidal turbines which feed into a mains grid. The isolated grid may be on an aircraft or other vessel such as a ship.

The electromagnetic machine may be operated as a motor or a generator. The electromagnetic machine may be coupled to a mechanical drive. The mechanical drive may be coupled to the modulator. The mechanical drive may comprise a gas turbine engine. The mechanical drive may be a shaft of a gas turbine engine or any rotating power system such as wind or tidal turbine. The shaft may be an intermediate compressor shaft of a gas turbine engine. Alternatively, the modulator may be coupled to a mechanical load.

In a third aspect, the present invention provides a method of controlling an electromagnetic machine according to the first aspect, comprising the steps of: exciting the first stator winding with a first current having a first frequency; and, exciting the second stator winding with a second current having a second frequency.

The first frequency or the second frequency may be zero. That is, the first or second current may be substantially direct current, DC. The first current or second current may be provided by a convertor. The first current or second current may be provided by a network.

The method may further comprise: monitoring the rotational speed of the modulator; determining whether it is within a predetermined speed range; and, adjusting the first or second frequency to maintain the speed within the predetermined range.

The method may further comprise the steps of: monitoring the voltage at the terminals of the electrical machine; determining if the voltage falls outside of a predetermined range; and, adjusting the first or second current to maintain the voltage at the terminals of the electrical machine to within the predetermined tolerance.

The electrical machine may be operated as a generator. The electrical machine may be operated as a motor.

Embodiments of the invention are described below with the aid of the following drawings in which.

Figure 1:
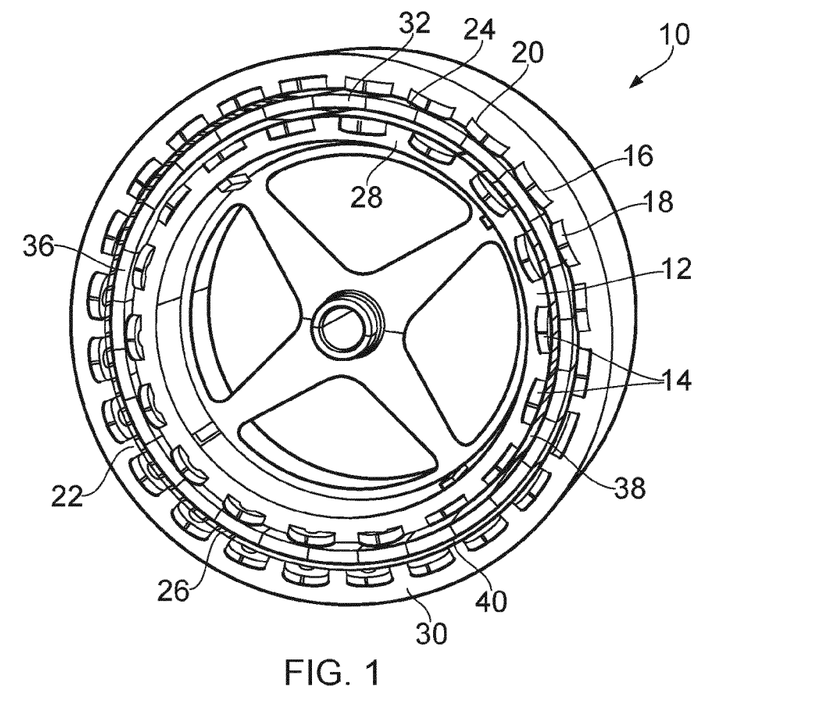
FIG. 1 shows a schematic representation of an electrical machine.

Thus, in FIG. 1 there is shown a schematic of an electrical machine 10 according to the present invention. The electrical machine 10 can be operated as a motor or a generator, each of which are described in more detail below.

The electrical machine 10 has a radial flux arrangement which includes an inner, first stator 12 which carries a first stator winding 14 in the form of a power winding, and a second, outer stator 16 which carries a second stator winding 18 in the form of a control winding and which opposes the first stator 12. Although the inner and outer windings are denoted as the power and control windings here, it will be appreciated from the following description that they are interchangeable.

The first and second stator windings 14, 18 are supported and partially surrounded by flux guides in the form of ferromagnetic poles 20, 22. The ferromagnetic poles include pole faces 24, 26 and back iron 28, 30 portions and are fixed relative to each other via a housing (not shown in FIG. 1) of the electrical machine 10. A modulator 32 is rotatably mounted coaxially with the rotational axis 34 of the electrical machine 10 and includes a plurality of high permeability portions in the form of ferromagnetic pole pieces 36 positioned between the first and second stator windings 14, 18.

The pole pieces 34 are substantially rectangular in radial section and uniformly distributed in a cylindrical configuration between the first and second stator windings 14, 18 with the longitudinal axis of the pole pieces 34 extending parallel to the rotational axis of the electrical machine 10. The pole pieces 34 are separated from the stator windings 14, 18 by respective first and second air gaps 38, 40, and from each other by low permeability portions 42 in the form of a non-magnetic material which could be air or any structural medium, for example, an epoxy such as PEEK (PolytEther Ether Ketone) or carbon fibre. The skilled person will appreciate that the modulator 32 will also include some form of support structure (not shown in FIG. 1), particularly where the pole pieces 36 are separated from each other by air.

The back iron portions 28, 30 define an envelope which forms a boundary of the magnetic circuit of the electrical machine and in which a modulated magnetic field can be set up in use. In this way, the back iron portions 28, 30 are placed at the inner most and outer most regions of the magnetically interacting parts of the electrical machine 10. It will be understood by the skilled reader that the term back iron encompasses any suitable high permeability material and is not confined to iron.

The operation of the electrical machine 10 employs a known magnetic modulation technique in which the modulator 32 is used to modulate the electromagnetic fields of the first and second stator windings 14, 18 so as to match their harmonic spectra. This modulation technique has been effectively demonstrated in the prior art in the technical field of magnetic gearboxes which utilises permanent magnets to provide a contra-rotating or co-rotating geared movement between two rotors.

Figure 8:
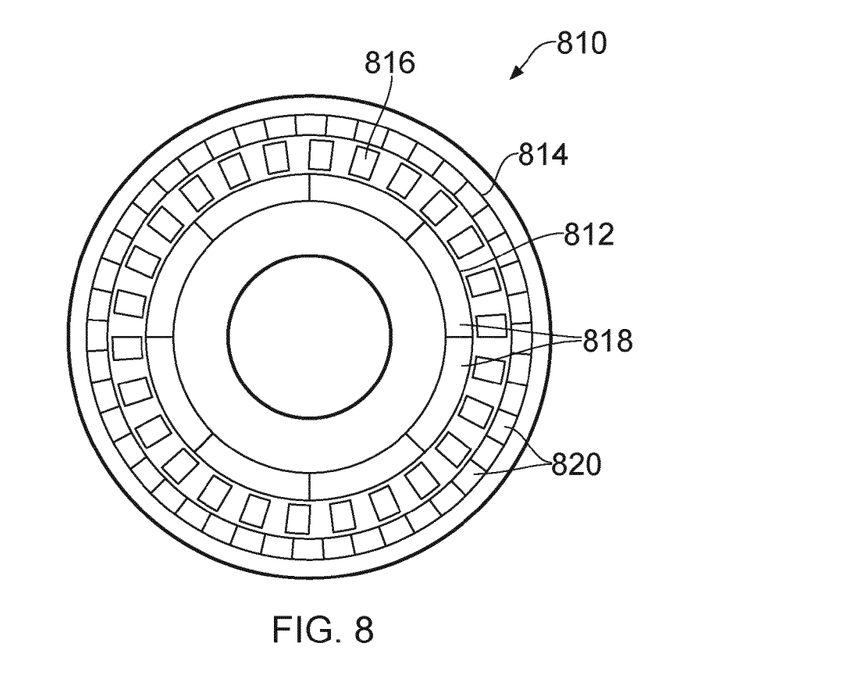
FIG. 8 shows a known magnetic gearbox arrangement which is included to aid with the explanation of the present invention only.

FIG. 8 shows a schematic cross section of a known magnetic gearbox 810 which is included to aid with the understanding of the operation of invention. The magnetic gearbox 810 includes an inner rotor 812, an outer rotor 814 and a modulator 816 which are substantially cylindrical and mounted concentrically so as to rotate relative to one another about a longitudinal axis of the gearbox 810. In the example provided in FIG. 8, the modulator 816 is held in a stationary position with the outer rotor 814 and inner rotor 812 coupled to a mechanical drive and load, respectively. However, one of the inner 812 or outer 814 rotors could be fixed with the modulator 816 being rotatable.

The inner 812 and outer 814 rotors include a plurality of permanent magnets 818, 820 which are separated from the modulator by respective air gaps 822, 824. The modulator 816 includes a plurality of laminated high permeability pole pieces 826 which are rectangular in cross section and evenly spaced about the circumference of the modulator 816.

In operation, the pole pieces 826 modulate the spatial magnetic field produced by the permanent magnets 818 of the inner rotor 812 to provide a magnetic spectrum in the air gap 822 adjacent the outer rotor 814. The magnetic spectrum is modulated so as to provide an asynchronous harmonic that matches the fundamental harmonic of the outer rotor 814 permanent magnets 820. Thus, when the inner rotor 812 is rotated, the outer rotor 814 is locked with the matched, asynchronous harmonic of the modulated magnetic field and thus rotated in a synchronous but geared manner. The modulation is balanced in that the magnetic field produced by the outer rotor 814 is modulated to match the fundamental spectrum of the inner rotor 812. Hence, if the outer rotor 814 is rotated, the inner rotor 812 will also rotate in a geared manner.

The operation of typical magnetic gearboxes which utilise harmonic spectra matching are further described in "A Novel High-Performance Magnetic Gear", K Atallah, D Howe, IEE transactions on magnetics, July 2001, and "A Novel "Pseudo" Direct-Drive Brushless Permanent Magnet Machine" K Atallah, J Rens, S Mezani, D Howe IEE transactions on magnetics, November 2008. This technique has been further utilised in U.S. Pat. No. 6,794,781 and GB2437568 which both describe different forms of electrical machine which integrate a magnetic gearbox with a synchronous electrical machine. All of these documents are incorporated by reference.

To put this in to the context of the present invention and with reference to FIG. 1, there is shown an electromagnetic machine 10 where the mechanical rotation of the inner rotor 812 is substituted by a travelling electromagnetic wave in the inner stator 12 which can be created according to well known techniques used in induction machines for example. The outer rotor 814 is replaced by a spatially distributed wave provided by a direct current in the outer stator 16. With this arrangement, the modulator 32 will be caused to rotate due to the matching of the harmonic spectra. The speed of rotation will be proportional to the rotational speed of the travelling electromagnetic wave.

The rotational speed of the pole pieces 32 when used as a motor is dependant on the excitation frequency, the number of pole pairs in both the inner 12 and outer 16 stators and the number of pole pieces.

Specifically, the gear ratio is given by:

$$\frac{\omega_{inner}}{\omega_{pole\_piece}} = \frac{p_{outer}}{p_{inner}} + 1$$

where $p_{outer}$ is the number of pole pairs on the outer stator, $p_{inner}$ is the number of pole pairs on the inner $\omega_{inner}$ is the rotational speed of the field set up by the inner winding and $\omega_{pole\_pieces}$ is the resultant speed of the modulator pole pieces 32.

The number of pole pieces is related to $p_{outer}$ and $p_{inner}$ by:

$$n_{pole\_pieces} = p_{inner} + p_{outer}$$

The electrical machine shown in FIG. 1 has a typical 3-phase lap winding arrangement in the outer and inner stators which uses one slot per pole per phase. The outer stator has sixteen poles (eight pole-pairs) 18 and the inner stator has twelve poles (six pole-pairs) 14 with a modulator having fourteen pole pieces 36 to achieve a magnetic gear ratio of 2.33. The stator windings 14, 18 are each connected to an electrical source or network in a conventional manner. The excitation provided to the windings from the electrical source will be dependant on the type of operation the machine is to perform which is explained further below.

Figure 2:
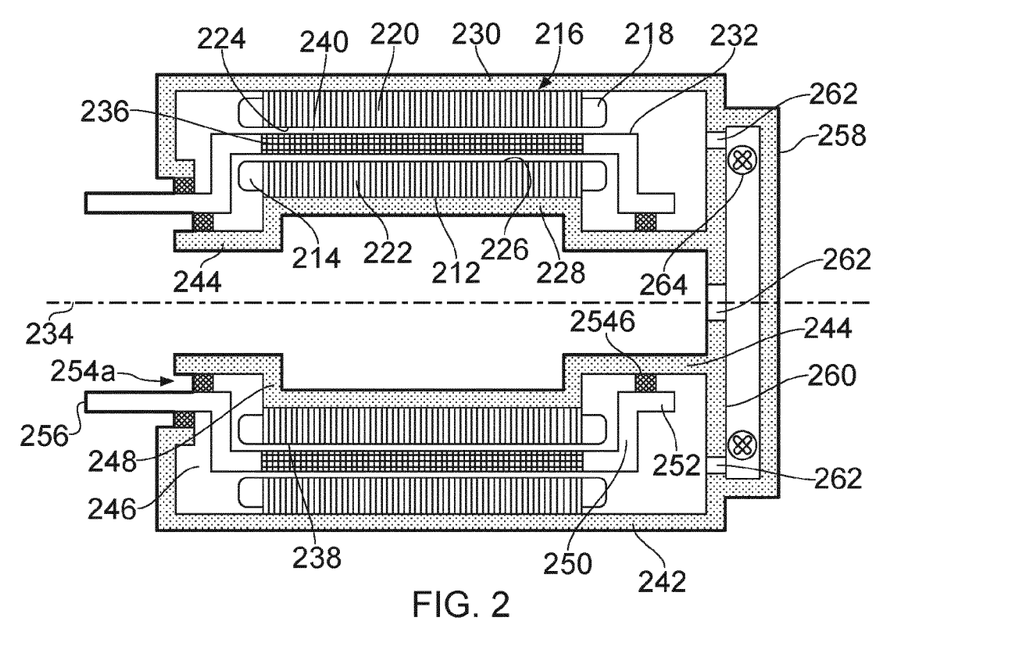
FIG. 2 shows a cross section of a second electrical machine.

FIG. 2 shows an axial cross section of an electrical machine 210 which is similar in construction to the machine shown in FIG. 1. Thus, the electrical machine 210 includes in radial series an inner, first stator 212, a modulator 232 which is rotatable about the longitudinal axis 234 of the electrical machine 210, and an outer, second stator 216. The modulator 232 has a plurality of pole pieces 236 which are separated from the first 212 and second 216 stators via respective air gaps 238, 240. The first 212 and second 216 stators include respective first 214 and second 218 stator windings and ferromagnetic flux guides 220, 222.

The first and second stator windings 214, 218 are held in a fixed relationship relative to one another via a housing 242. The outer stator 216 is attached directly to the housing 242 and the inner stator 212 is held on a cylindrical hollow support member 244.

The pole pieces 234 of the modulator 216 are positioned between the first 214 and second 218 stator windings. The pole pieces 236 are rectangular in radial section and axially extend substantially parallel to the rotational axis 234 of the electrical machine 210. The pole pieces 236 are supported via a support structure 246 which includes first 248 and second 250 radial flanges which extend perpendicularly from the shaft 252 of the modulator 232. The modulator shaft 252 is co-axial with the rotational axis 234 of the electrical machine 210 and rotatably mounted to the housing 242 and inner stator support member 244 via bearing sets 254a, 254b located either side of the first and second radial flanges at either end of the modulator shaft 242.

The modulator 232 can be either mechanically driven or drive depending on whether the electrical machine 210 is operating as a generator or motor. Hence, a first end 256 of the modulator shaft 252 is arranged to be coupled to a mechanical drive for which conventional means can be used.

The stator windings 214, 218 terminate in a terminal box 258 mounted on an exterior end face 260 of the housing 242, at the opposite axial end to the first end of the modulator shaft 252. The exterior end face 260 of the housing 242 includes apertures 262 through which respective wires from the first 214 and second 218 windings pass for connection. The conductors of an external electrical source can enter the terminal box 258 via conventional means as required by the chosen wiring system.

The terminal box 258 also houses ventilation means in the form of two centrifugal fans 264 which provide the interior of the machine housing 242 with a flow of cooling air through the apertures 262 described above.

In order to provide control of the motoring and generating functions, the electrical machine also includes a rotor position encoder (not shown) which provides the positional information of the rotor. The output of the encoder can be used by a controller to determine what the position of the modulator is relative to the rotating magnetic field. Hence, if there is a change in speed in the machine, the frequency and phase of the control winding excitation can be adjusted via a convertor to ensure that the machine retains the generating or motoring function, as required. The skilled person will appreciate that other control mechanisms can be used to achieve the regulated operation of the electrical machine.

Figure 3:
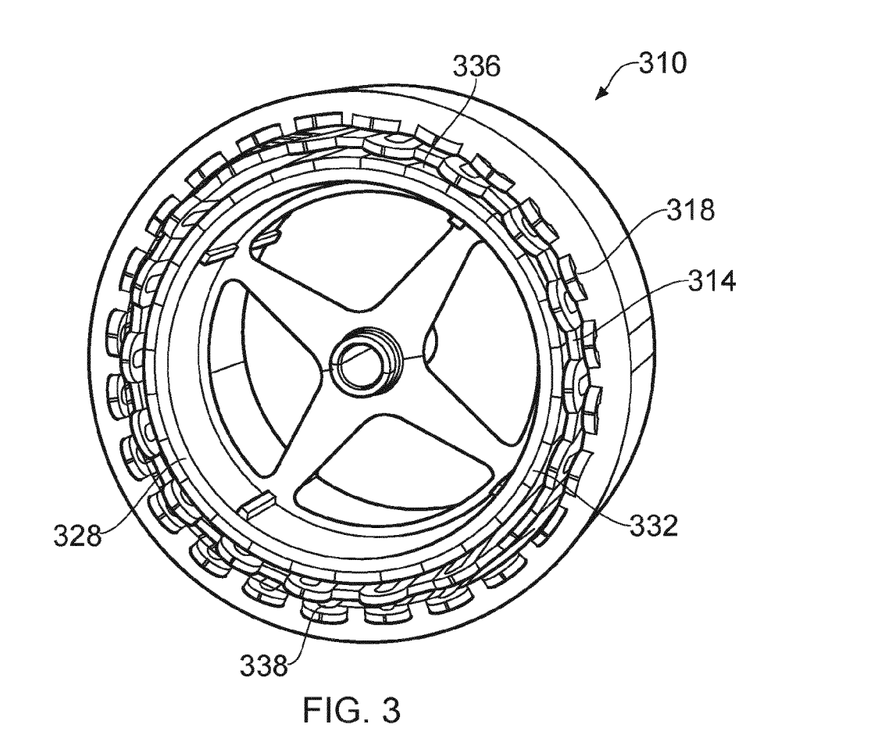
FIG. 3 shows a schematic representation of a third electrical machine.
Figure 4:
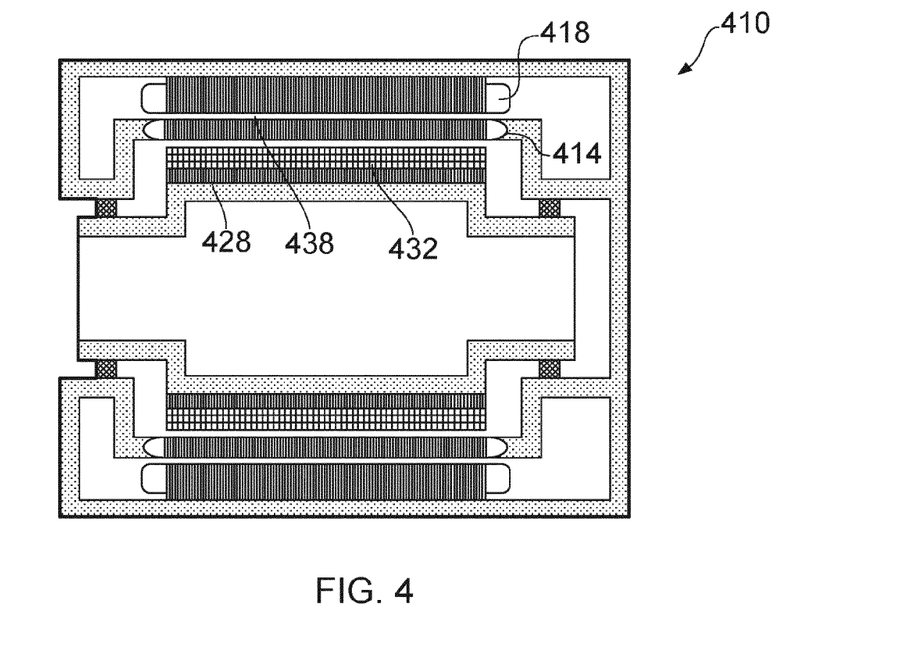
FIG. 4 shows a cross section of a fourth electrical machine.

FIGS. 3 and 4 show further embodiments of the invention. As with the previous embodiments, the electrical machines 310, 410 shown in FIGS. 3 and 4 include first 314, 414 and second 318, 418 stator windings and a rotatable modulator 332, 432. However, in these embodiments, the first 314, 414 and second 318, 418 stator windings are placed proximate to each other with the modulator 332, 432 positioned inside the inner stator winding 314, 414. In this way, the inner stator 314, 414 winding is located between the pole pieces 336, 436 and outer stator winding 418 and does not include an integral back iron portion. However, the inner circumferential surface of the modulator includes a back iron portion 328, 428 thereby forming the envelope as described above and preventing unnecessary flux leakage.

The electrical machine 310, 410 is shown as having an air gap 338, 438 between the first 314 and second 414 stator windings in FIGS. 3 and 4. Although the electrical machine 310, 410 will theoretically operate with such an air gap 338, 438 it is preferable to have little or no air gap between the stator windings in order to prevent the associated reluctance and magnetic losses. Hence, the first and second stators share a common ferromagnetic flux guide which is formed as a single structure.

Although FIG. 4 does not show the terminal box or ventilation features of the embodiment shown in FIG. 2, it will be appreciated that these can be incorporated as required.

Figure 5:
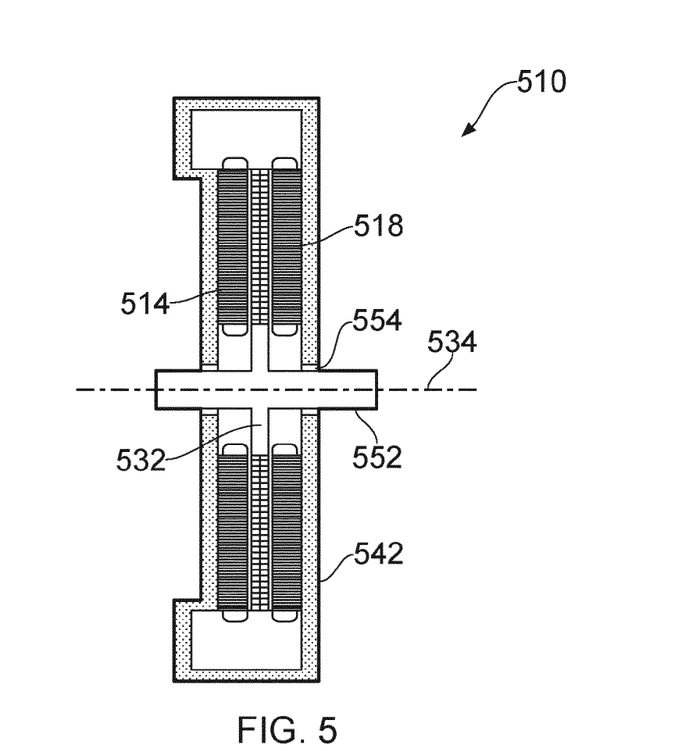
FIG. 5 shows an axial flux electrical machine.

FIG. 5 shows a cross section of a further embodiment of the electrical machine 510 of the invention. The electrical machine 510 of this embodiment has an axial flux arrangement. Thus, there are first 514 and second 518 stator windings arranged in a plane which is perpendicular to the axis of rotation 534 of the electrical machine 514 so as to provide an electromagnetic field having flux lines which run substantially parallel to the axis of rotation 534. The modulator 532 extends perpendicularly from the modulator shaft 552 so as to be positioned between the stator windings 514, 518 and orthogonal to the electromagnetic field produced by the windings 514, 518. The modulator shaft 532 is supported by the housing 542 of the electrical machine 510 via bearing sets 554 placed equidistantly of the pole piece support structure. It will be appreciated that the ratio of pole pairs of the stator windings and pole pieces follow the same relationships described in the above embodiments.

Figure 6:
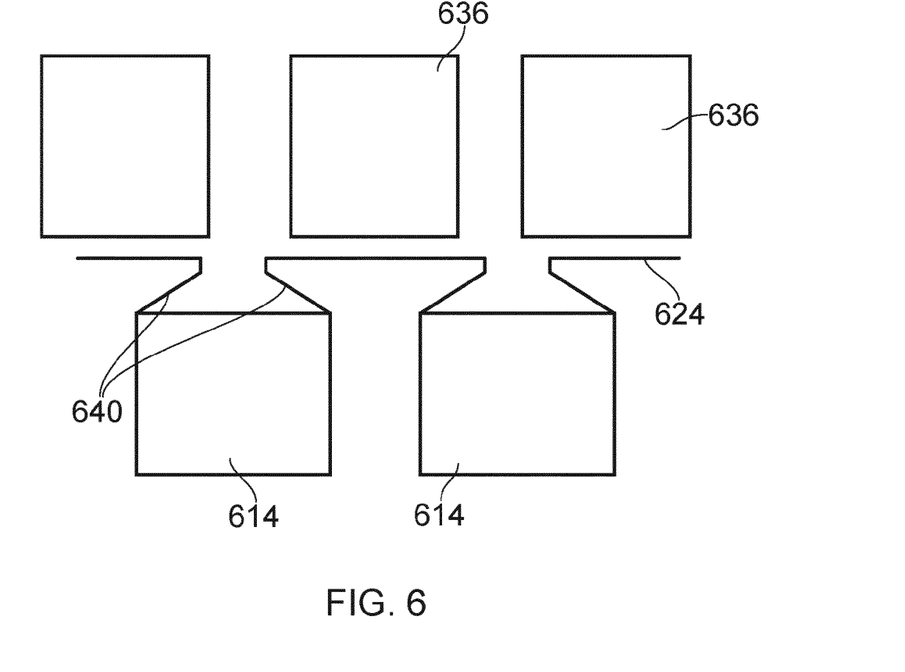
FIG. 6 shows a detailed cross section of a stator winding.

FIG. 6 shows a cross section of a portion of the inner stator winding conductors 614 and pole face 624 of the ferromagnetic flux guide beneath the pole pieces 636 of the modulator. It can be seen that the stator teeth include tapered flange portions 640 at the distal ends thereof so as to provide flared pole faces 624. This configuration helps reduce the higher order slotting harmonics in the windings 614 so as to better mimic a permanent magnet arrangement. The skilled reader will appreciate that the inner and outer stator can include flared pole portions.

The electrical machines described above can be made using conventional manufacturing techniques well known in the technical field. Hence, for example, the housing can be made from steel and the windings from copper. The pole pieces and ferromagnetic cores are made from laminations of steel.

The use of alternating current in the inner and outer stator windings allows the field strength within the machine to be modified and the vector of the field to be rotated at given speed. Thus, if one winding is connected directly to an electrical network the voltage and frequency are defined for that winding. The second winding can then be used to establish field strength needed to maintain voltage equilibrium with the frequency and phase on the winding used to impose the torque relationship required upon the modulator. The result is an electrical machine that is able to achieve variable speed operation whilst directly connected to the electrical supply.

The electrical behaviour of the machine is generally similar to a conventional synchronous machine and the control methods used on synchronous machines are generally applicable to the electrical machine of the present invention.

Figure 7:
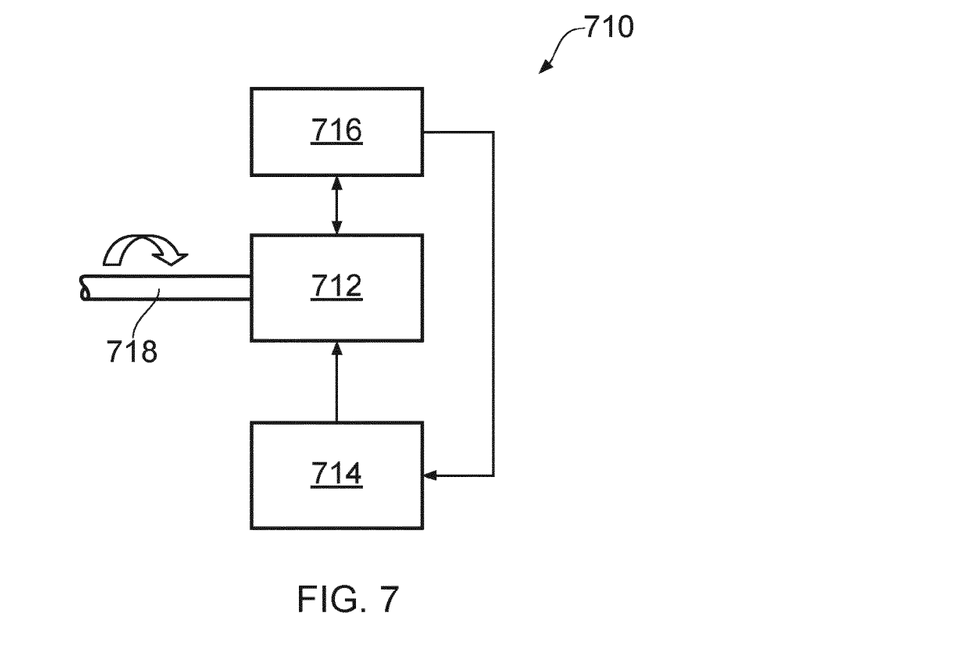
FIG. 7 shows a schematic representation of an electrical system incorporating the electric machine.

FIG. 7 shows a schematic of an electrical system 710 in which the electrical machine is used. The system includes: the electrical machine 712 of the invention having a power winding, a control winding and a modulator; an electrical source in the form of a convertor 714; and a network 716. The modulator of the electrical machine 712 is connected to a rotatable mechanical load or drive (not shown) via a shaft 718.

In the system shown in FIG. 7, the network 716 is connected to the power winding and the convertor 714. The convertor 714 is configured to excite the control winding with an electrical frequency within a range extending from zero, i.e. direct current, DC. The upper limit of the frequency range provided to the control winding will depend on the gear ratio between the windings, the frequency of the network and the required performance of machine in terms of the rotational speed of the modulator.

The network 714 may have a substantially constant supply frequency and voltage or may be variable in each instance. For example, the electrical network 714 may be a 50 or 60 Hz mains grid with a fixed frequency and rigid voltage, or could be an isolated network in the form of an aircraft network requiring a frequency in the range between 350 and 800 Hz.

Where the frequency in the power winding is substantially fixed, the frequency of the control winding supply can be adjusted to provide a different synchronous speed in the machine 712. For a variable frequency network, the control winding supply can be adjusted either to maintain a constant speed or provide a variable speed, as required.

The mechanical shaft 718 can be connected to a mechanical load when the machine 712 is to motor, or a mechanical drive when the machine 712 is to be used as a generator. The source of mechanical drive could be from a wind or tidal turbine, or a combustion engine such as a gas turbine engine, although any suitable source of mechanical drive could be used.

For a fixed speed, the control winding is provided with a direct current, D.C., from the convertor 714. The power winding is connected to the network 716. To operate the machine 712 as a generator in this configuration, the modulator is driven through the shaft 718 by a suitable drive as described above. The DC in the control winding sets up a magnetic field which interacts with the rotating modulator to provide a rotating magnetic field which induces a voltage in the power winding which is connected to a load, via the network.

In the case of a preferred embodiment where the machine 712 is employed within an aircraft generation system, the voltage in the network can be regulated by increasing the magnitude of the voltage in the control winding which alters the field strength. If the machine 712 is connected to a fixed voltage network 716, then altering field strength can be used to control the reactive power in the network 716.

For a variable speed operation, the control winding is fed with AC. The frequency of the AC will depend on the gear ratio between the windings, the frequency of the network 716, and the required performance of machine 712 in terms of the rotational speed of the modulator.

The connection of the mechanical drive 718 and load notwithstanding, when the control winding is fed with an AC current the convertor 714 can be adapted to control the power factor of the excitation provided to the control winding. Thus, as is generally known in the art for synchronous machines, for a fixed load at a given speed the electrical machine 712 can either be motoring or generating depending on the phase control of the excitation current in the control winding. Hence, if there is a change in speed in the machine 712, the frequency and phase of the control winding excitation can be adjusted via a convertor 714 to ensure that the machine 712 retains the generating or motoring function, as required.

The invention claimed is:

1. An electromagnetic machine, comprising:
a first stator winding having a first number of pole pairs;
a second stator winding having a second number of pole pairs which is different to the first number of pole pairs, wherein the first and second stator windings are fixed relative to each other; and
a modulator having a plurality of high magnetic permeability pole pieces arranged relative to the first and second stator winding so as to modulate electromagnetic fields produced by the first and second stator windings, thereby matching harmonic spectra of the first and second stator windings, wherein each of the modulator and either the first or second stator winding has a back iron portion such that the modulator and the first and second stator windings are located within the back iron of the modulator and the back iron of the first or second stator winding thereby providing a magnetic envelope for the modulated electromagnetic fields, and
wherein:
either the first or second stator winding is positioned between the other of the first or second stator winding and the modulator, the modulator is rotatable and the first and second stator winding are stationary relative to each other and the modulator, and the modulator is positioned adjacent to one side of either the first or the second stator winding.

2. The electromagnetic machine as claimed in claim 1 wherein the first and second stator windings are proximate to one another.

3. The electromagnetic machine as claimed in claim 1 wherein the first and second stator windings are located on a single stator.

4. The electromagnetic machine as claimed in claim 1 wherein the first and second stator windings are arranged so as to provide radial flux with respect to the axis of rotation of the modulator.

5. The electromagnetic machine as claimed in claim 1 wherein the first and second stator windings are arranged so as to provide axial flux with respect to the axis of rotation of the modulator.

6. The electromagnetic machine as claimed in claim 1 wherein the sum of the first and second stator pole pairs is the same as the number of inter pole pieces.

7. An electrical system, comprising:
the electromagnetic machine of claim 1;
a convertor connected to at least one of the first or second windings; and,
an electrical network connected to the other of the first and second windings.

8. An electrical system as claimed in claim 7, wherein the convertor is configured to supply a direct current to the winding to which it is connected.

9. An electrical system as claimed in claim 8 further comprising a gas turbine which is configured to rotate the modulator.

10. A method of controlling an electromagnetic machine as claimed in claim 1, comprising the steps of:
exciting the first stator winding with a first current having a first frequency; and,
exciting the second stator winding with a second current having a second frequency.

11. A method as claimed in claim 10 wherein either the first frequency or the second frequency is substantially zero.

12. A method as claimed in claim 10 wherein the first current or second current is provided by a convertor.

13. A method as claimed in claim 10 further comprising:
monitoring the rotational position of the modulator relative to the rotating magnetic field in the electrical machine;
determining whether it is within a predetermined speed range; and,
adjusting the first or second frequency to maintain the speed within the predetermined range.

14. The electromagnetic machine as claimed in claim 1, wherein the magnetic permeability of the pole pieces is greater than 100.

15. The electromagnetic machine as claimed in claim 1, wherein the plurality of high magnetic permeability pole pieces are separated by low permeability, low remanence regions.

16. The electromagnetic machine as claimed in claim 1, wherein the plurality of high magnetic permeability pole pieces have one of either the first or second stator coil on a first side thereof and a back iron portion a second side thereof.

17. The electromagnetic machine as claimed in claim 1, wherein the first stator winding and second stator winding are separated by an air gap.

18. The electromagnetic machine as claimed in claim 1, wherein the first stator winding, second stator winding and modulator are enveloped by back iron portions in which a first back iron portion is adjacent to the modulator on the opposite side of the first and second stator windings, and a second back iron portion is outside and adjacent the stator winding which is separated from the modulator by the other of the first or second stator winding.

* * * * *